US012568556B2

(12) United States Patent
Kim

(10) Patent No.: US 12,568,556 B2
(45) Date of Patent: Mar. 3, 2026

(54) ELECTRODE HEATING UNIT AND DEVICE, AND CONTROL METHOD FOR PROTECTING ELECTRICAL SHORT THEREFOR

(71) Applicant: AWESOME LAB CO., LTD., Seongnam-si (KR)

(72) Inventor: Dong-muk Kim, Seongnam-si (KR)

(73) Assignee: AWESOME LAB CO., LTD., Seongnam-si (KR)

( * ) Notice: Subject to any disclaimer, the term of this patent is extended or adjusted under 35 U.S.C. 154(b) by 839 days.

(21) Appl. No.: 17/780,528

(22) PCT Filed: May 21, 2021

(86) PCT No.: PCT/KR2021/006311
§ 371 (c)(1),
(2) Date: May 27, 2022

(87) PCT Pub. No.: WO2022/114418
PCT Pub. Date: Jun. 2, 2022

(65) Prior Publication Data

US 2023/0292408 A1 Sep. 14, 2023

(30) Foreign Application Priority Data

Nov. 25, 2020 (KR) ........................ 10-2020-0159695

(51) Int. Cl.
*H05B 3/78* (2006.01)

(52) U.S. Cl.
CPC ..................................... *H05B 3/78* (2013.01)

(58) Field of Classification Search
None
See application file for complete search history.

(56) References Cited

U.S. PATENT DOCUMENTS 1,171,929 A * 2/1916 Cubitt ..................... F24H 1/106 392/338
1,526,759 A * 2/1925 Rauchfuss ................ F22B 1/30 392/329

(Continued)

FOREIGN PATENT DOCUMENTS

KR 10-0274292 B1 12/2000
KR 10-2018-0129325 A 12/2018

(Continued)

OTHER PUBLICATIONS

International Search Report for PCT/KR2021/006311 mailed Feb. 25, 2022 from Korean Intellectual Property Office.

*Primary Examiner* — Thor S Campbell
(74) *Attorney, Agent, or Firm* — Revolution IP, PLLC

(57) ABSTRACT

According to an embodiment of the present invention, provided is an electrode heating device including: a device housing; an electrode heating unit including a central conductor, an internal conductor disposed to form a gap inside the central conductor, and an external conductor disposed to form the gap outside the central conductor, and received and installed in the device housing; and a control board received and installed inside the device housing, and applying power to an electrode of the electrode heating unit, and controlling a heat generation operation of the electrode heating unit.

5 Claims, 21 Drawing Sheets

(56) References Cited

U.S. PATENT DOCUMENTS

| | | | | | | |
|---|---|---|---|---|---|---|
| 2,572,337 | A | * | 10/1951 | Harris | F24H 1/106 | 392/338 |
| 2,618,732 | A | * | 11/1952 | Bernd | F24H 1/106 | 392/338 |
| 2,748,253 | A | * | 5/1956 | Bremer | F24H 1/106 | 392/338 |
| 3,582,612 | A | * | 6/1971 | Siemianowski | H01H 35/42 | 392/311 |
| 3,688,077 | A | * | 8/1972 | Williams | F22B 1/303 | 392/338 |
| 3,796,857 | A | * | 3/1974 | Henley | F24H 1/106 | 392/338 |
| 3,867,610 | A | * | 2/1975 | Quaintance | F24H 1/106 | 392/338 |
| 3,925,638 | A | * | 12/1975 | Scatoloni | F24H 1/106 | 392/338 |
| 4,029,937 | A | * | 6/1977 | Russell | F24H 15/174 | 392/338 |
| 4,288,684 | A | * | 9/1981 | Katou | F24F 6/18 | 392/335 |
| 4,314,139 | A | * | 2/1982 | Williams | F22B 1/306 | 122/4 A |
| 5,748,459 | A | | 5/1998 | Yamada et al. | | |
| 5,933,575 | A | | 8/1999 | Sanders | | |
| 6,130,990 | A | * | 10/2000 | Herrick | H05B 3/60 | 392/338 |
| 7,068,924 | B2 | * | 6/2006 | Watanabe | A61H 33/12 | 392/386 |
| 8,953,932 | B2 | * | 2/2015 | Hughes | F24H 9/2028 | 392/314 |
| 9,326,399 | B2 | * | 4/2016 | Stringer | G01R 15/14 | |
| 2006/0239664 | A1 | * | 10/2006 | Chaput | F24H 1/106 | 392/338 |
| 2012/0308217 | A1 | * | 12/2012 | Wiedlroither | F24H 1/106 | 392/485 |

FOREIGN PATENT DOCUMENTS

| | | | |
|---|---|---|---|
| KR | 10-2045969 | B1 | 11/2019 |
| KR | 10-2020-0034263 | A | 3/2020 |

* cited by examiner

【Figure 1】
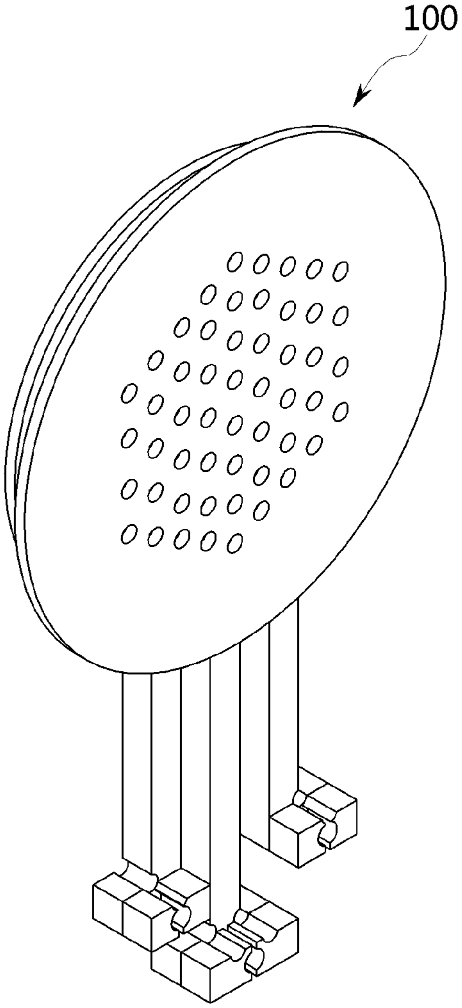

【Figure 2】
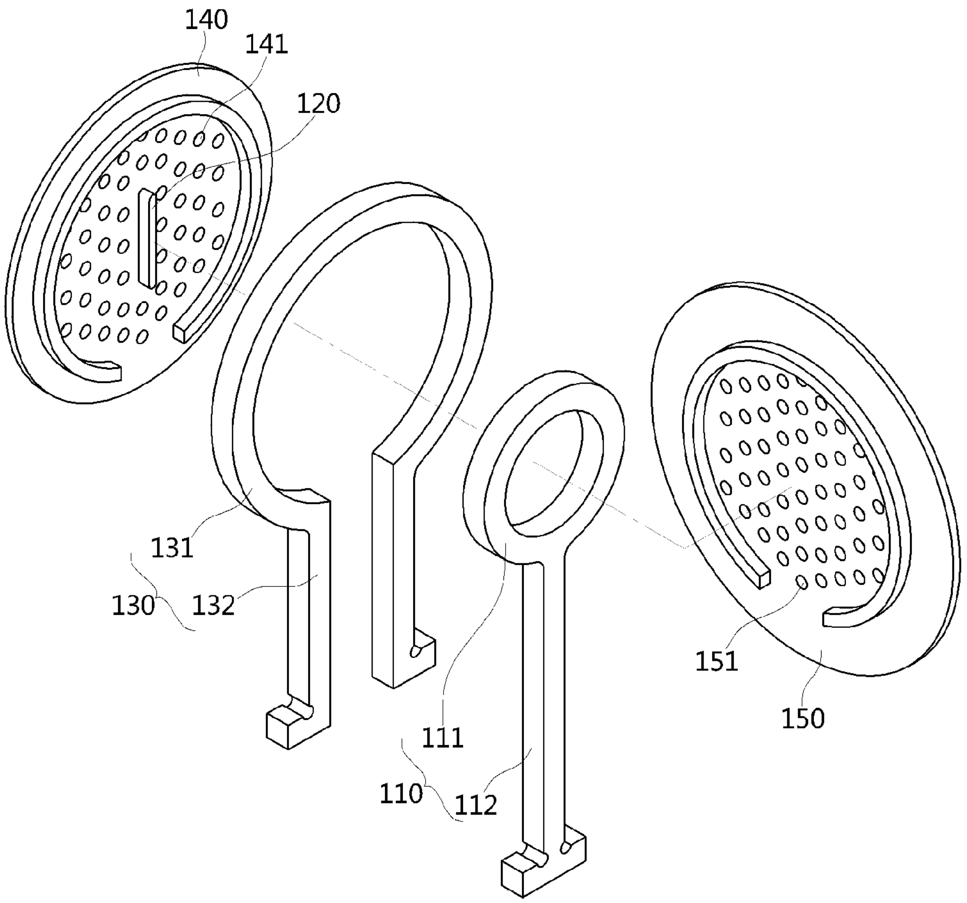

【Figure 3】
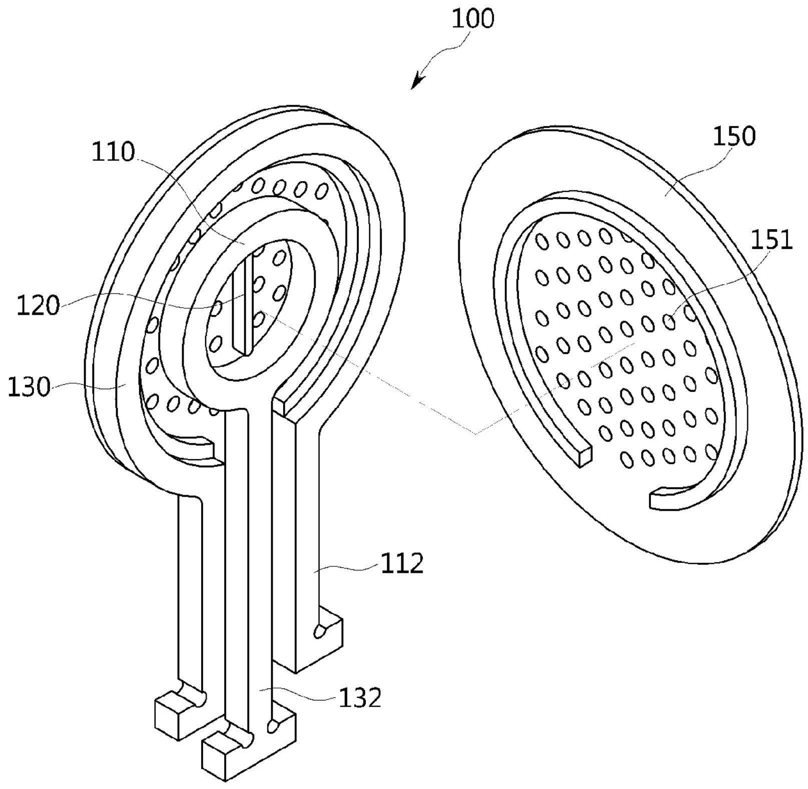

【Figure 4】
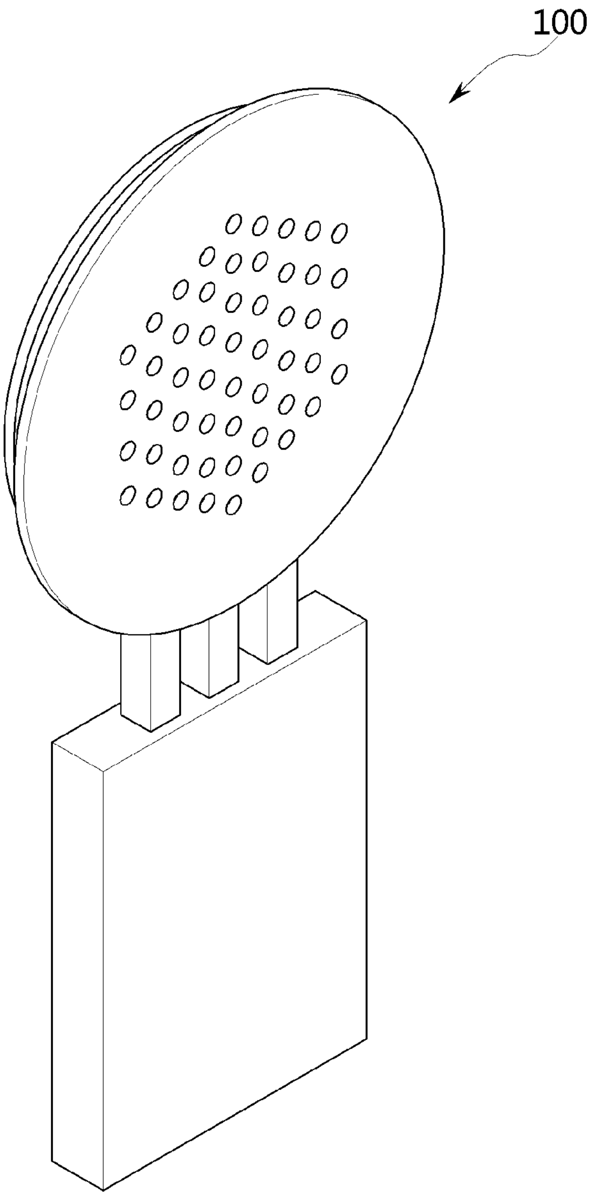

【Figure 5】
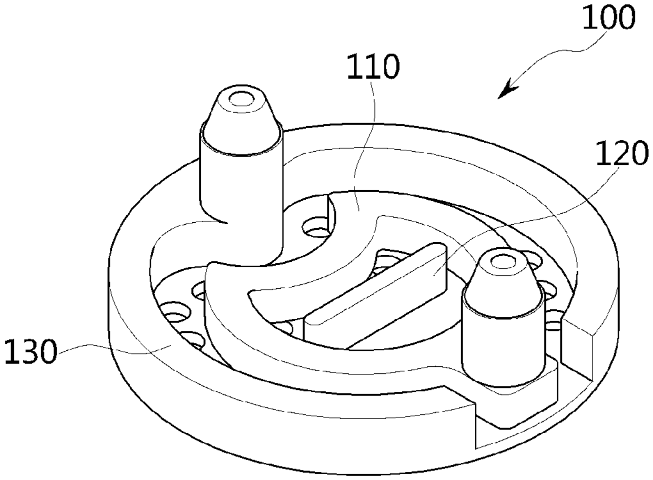
【Figure 6】
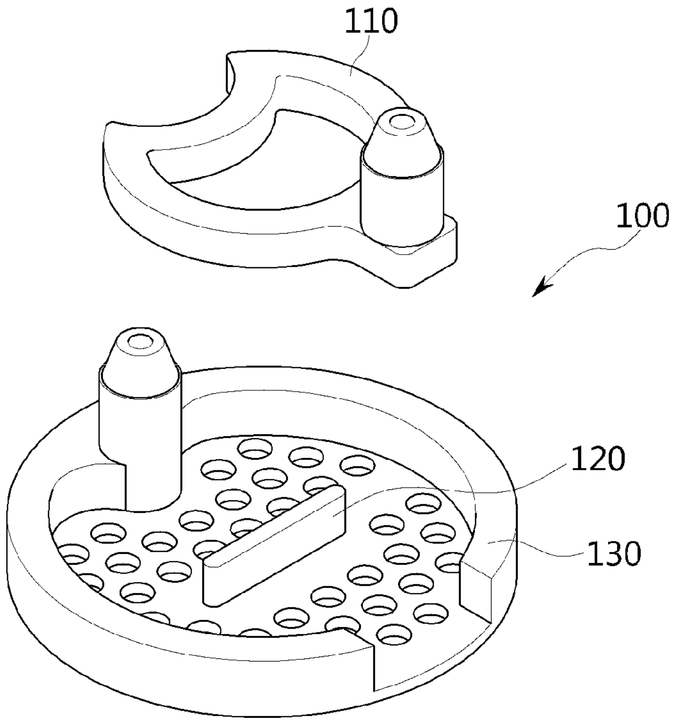

【Figure 7】
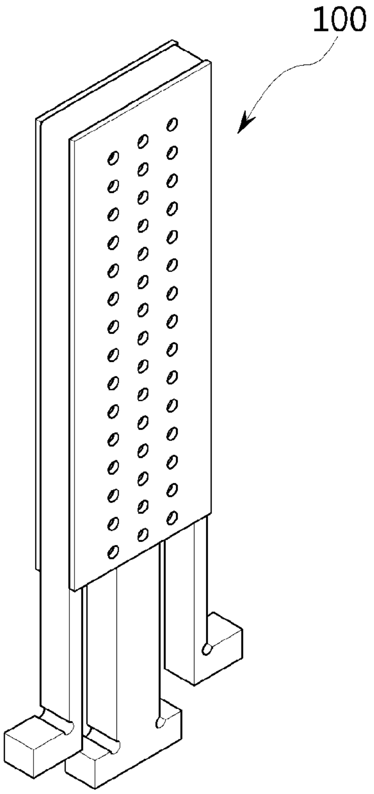

【Figure 8】
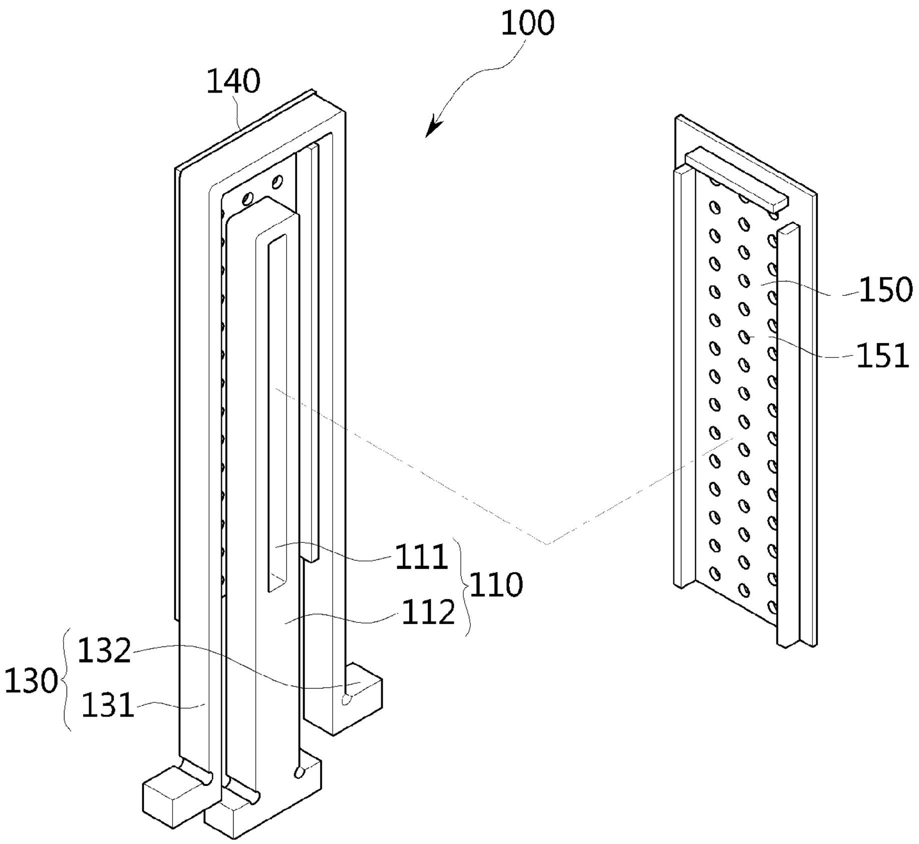

【Figure 9】
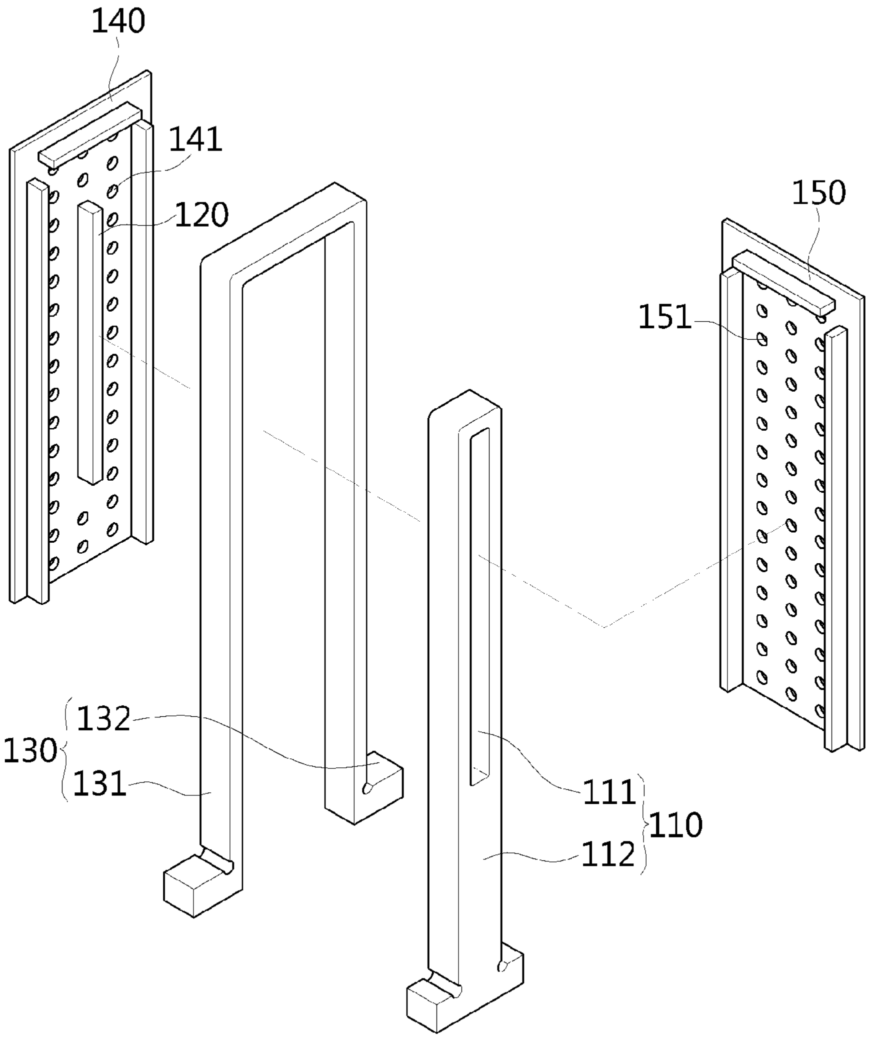

【Figure 10】
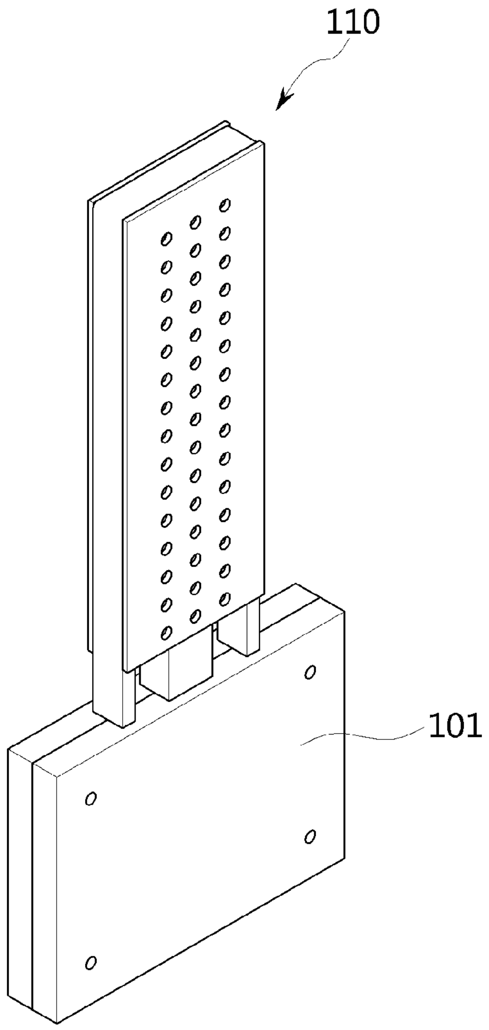

【Figure 11】
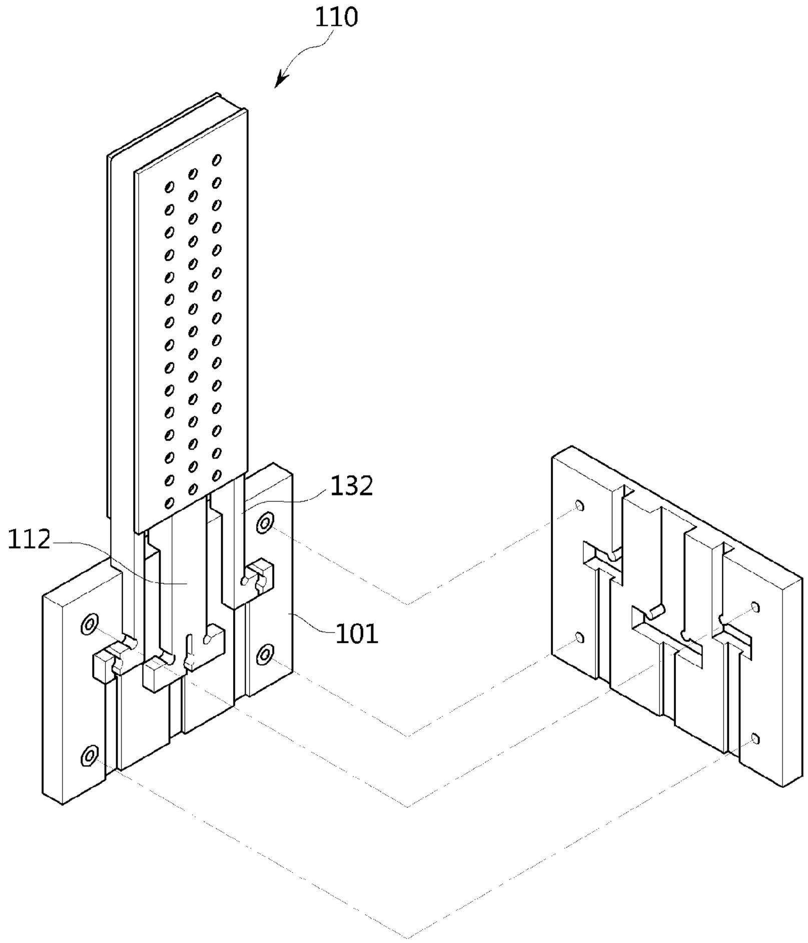

【Figure 12】
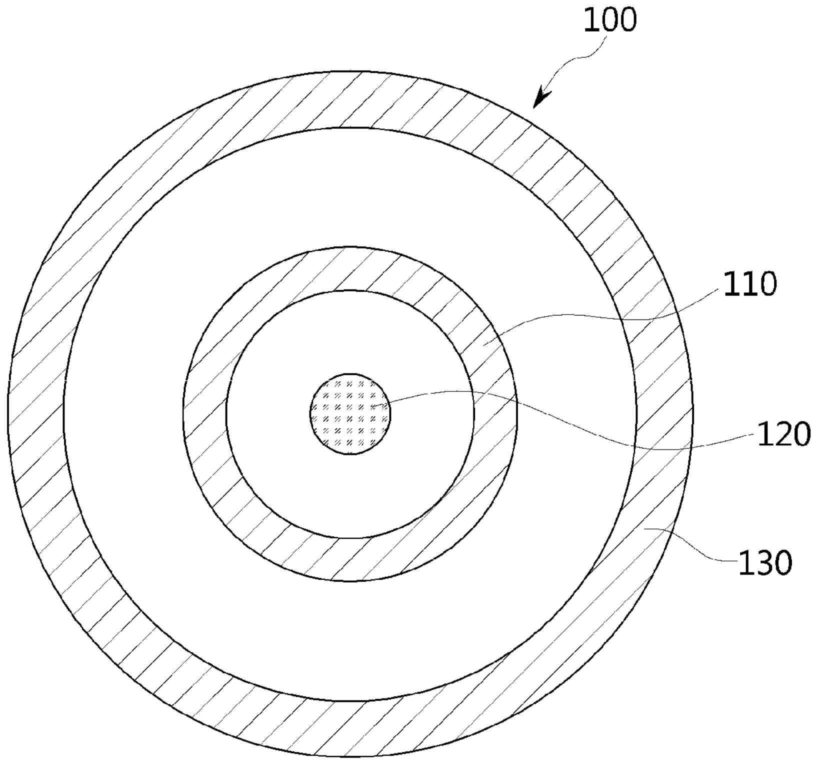

【Figure 13】
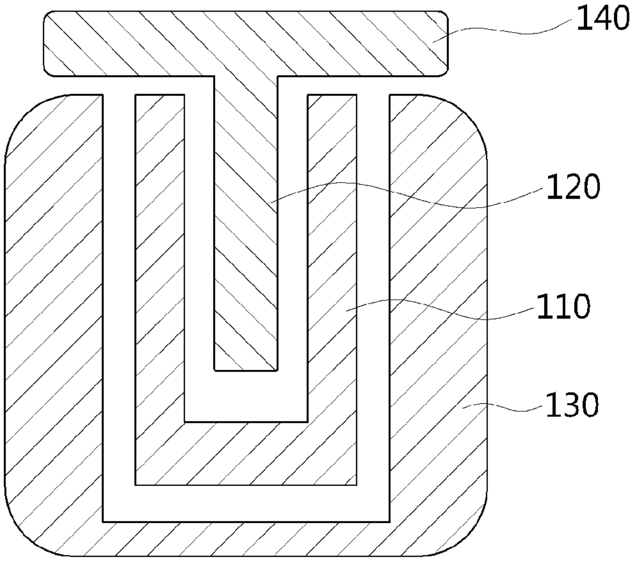
【Figure 14】
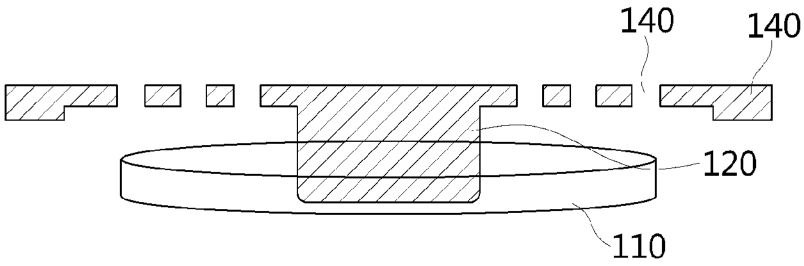

【Figure 15】
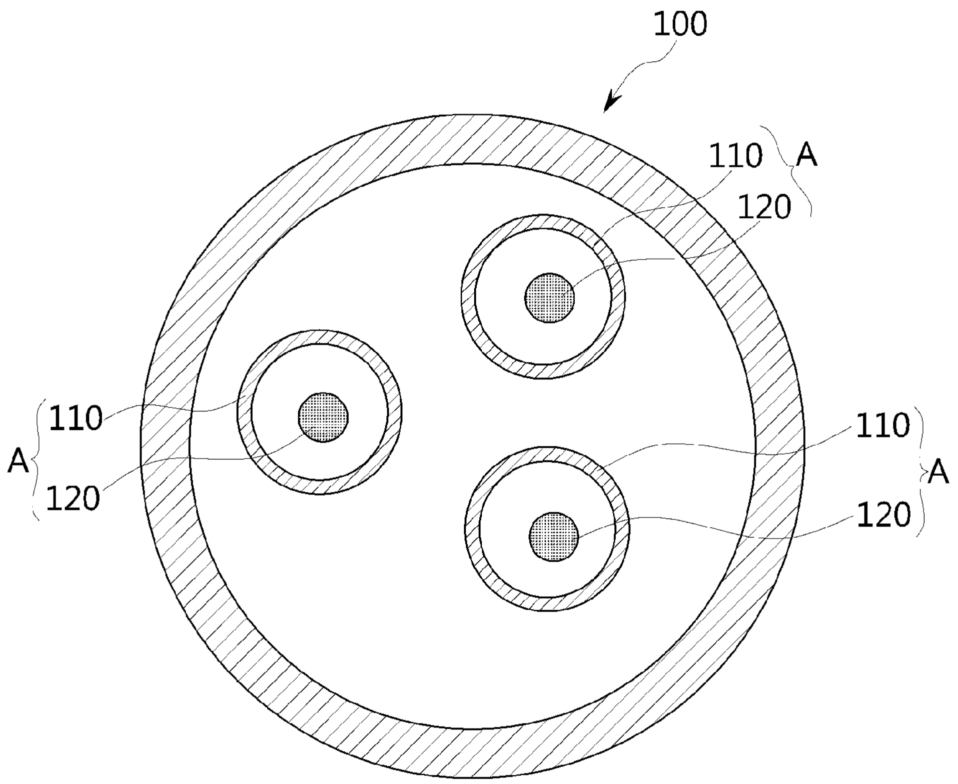

【Figure 16】
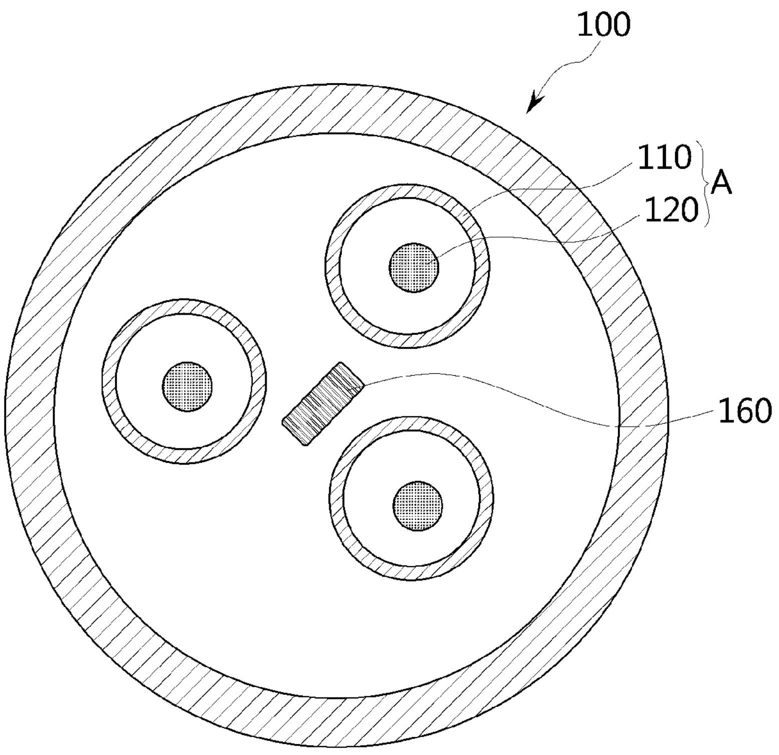

【Figure 17】
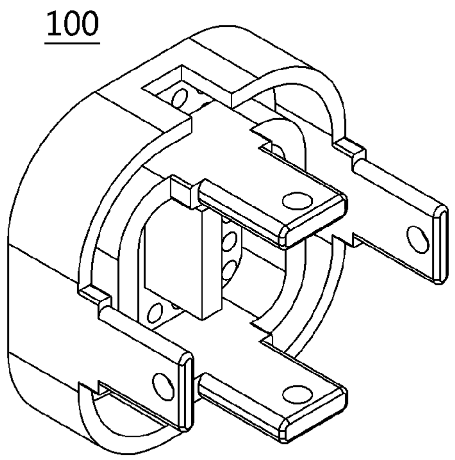
【Figure 18】
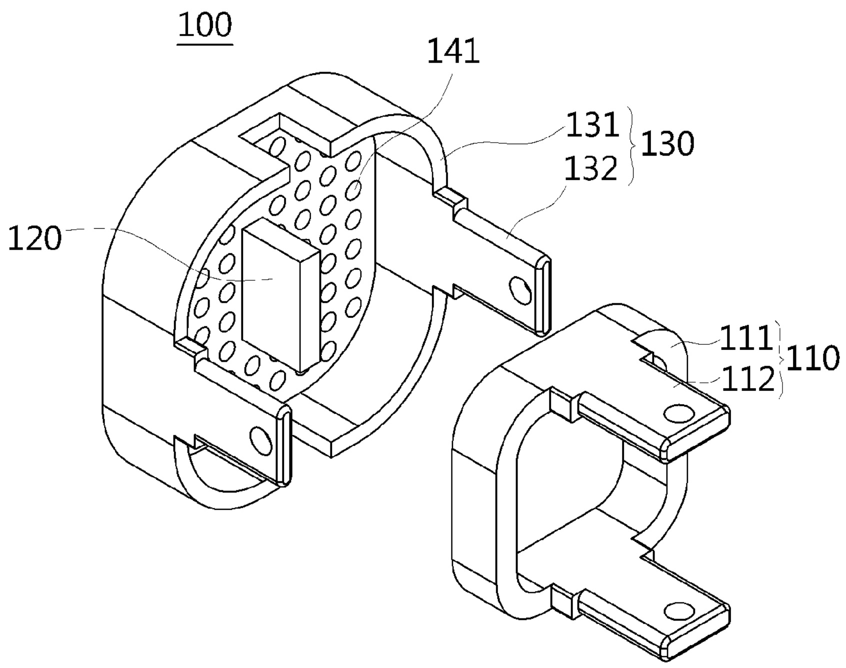

【Figure 19】
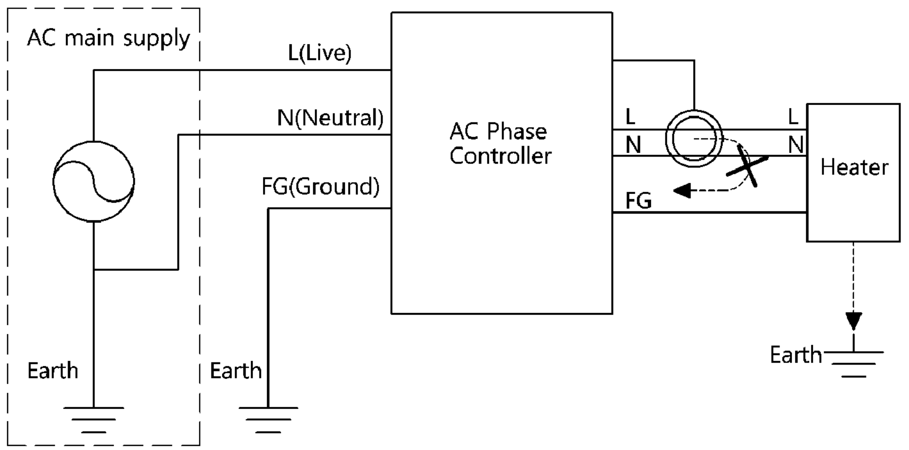
【Figure 20】
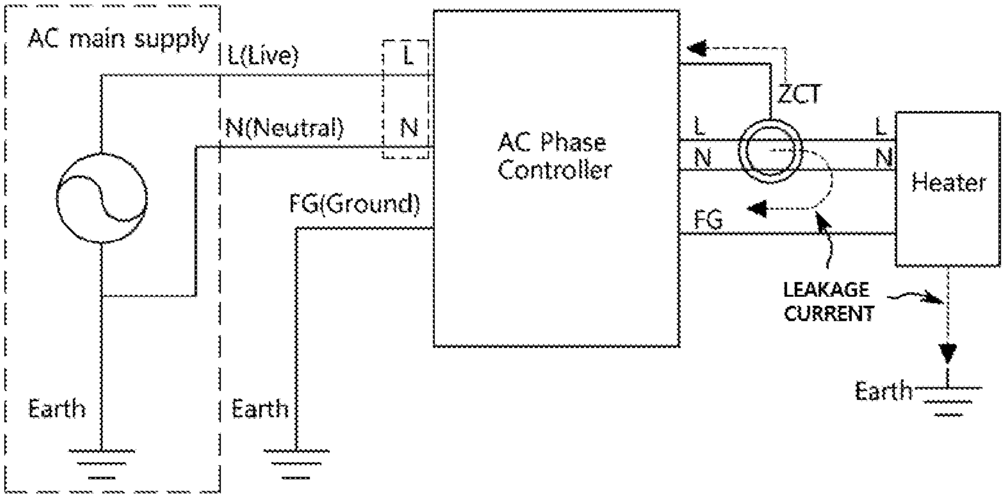

【Figure 21】
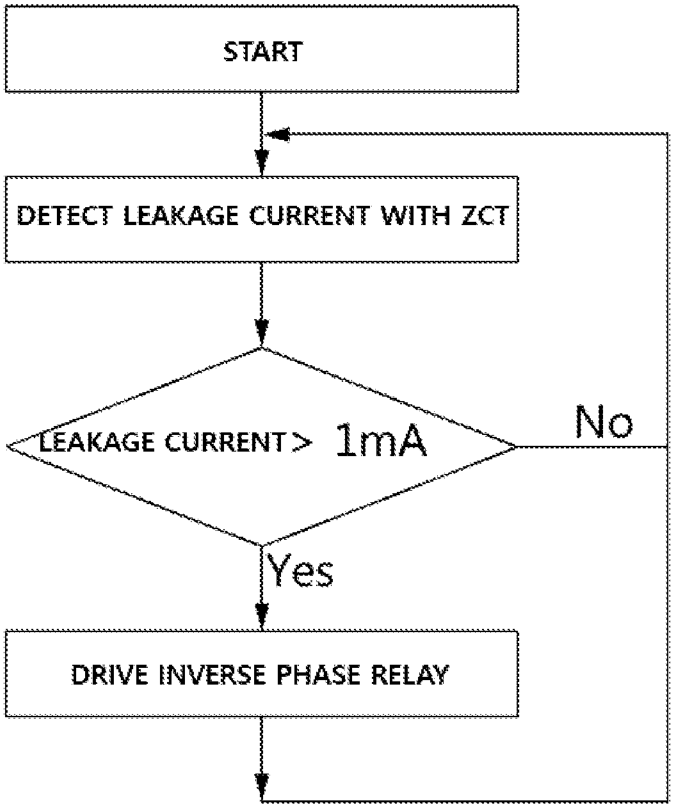

【Figure 22】
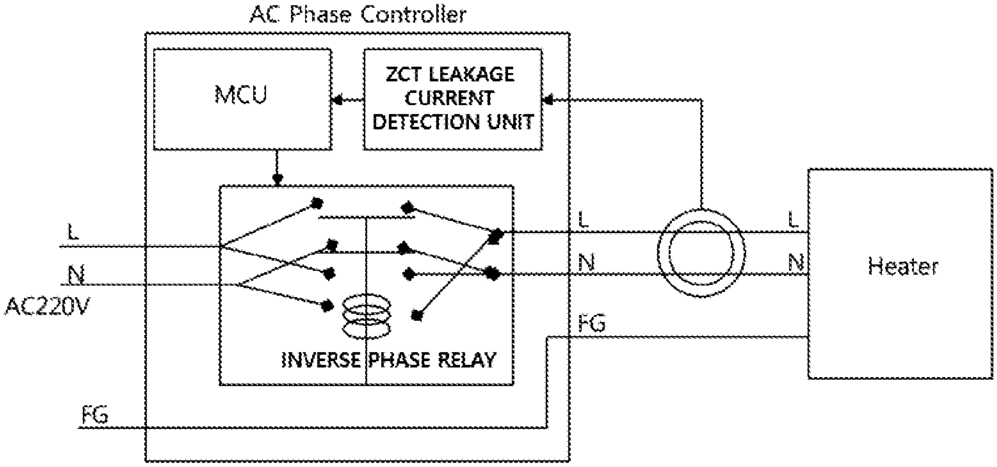
MCU : Micro controller Unit
ZCT : Zero Current Transformer
【Figure 23】
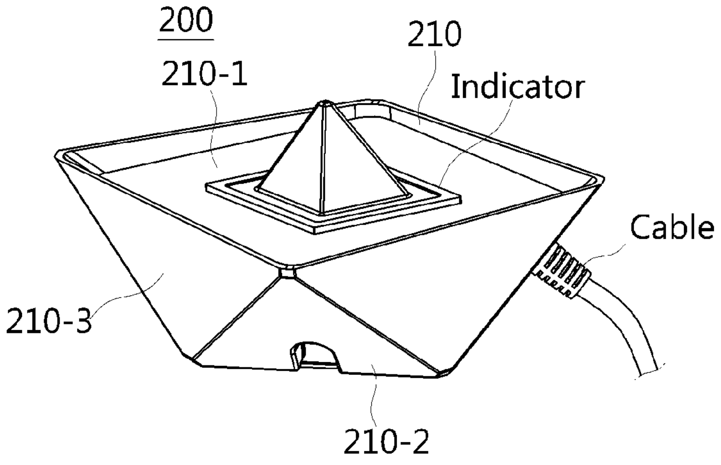

【Figure 24】
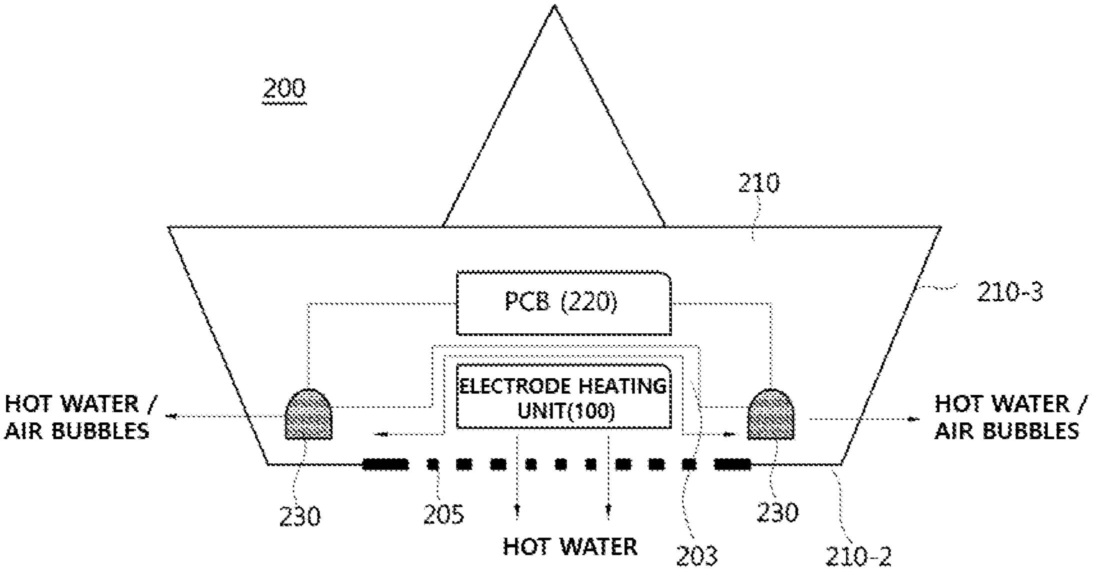
【Figure 25】
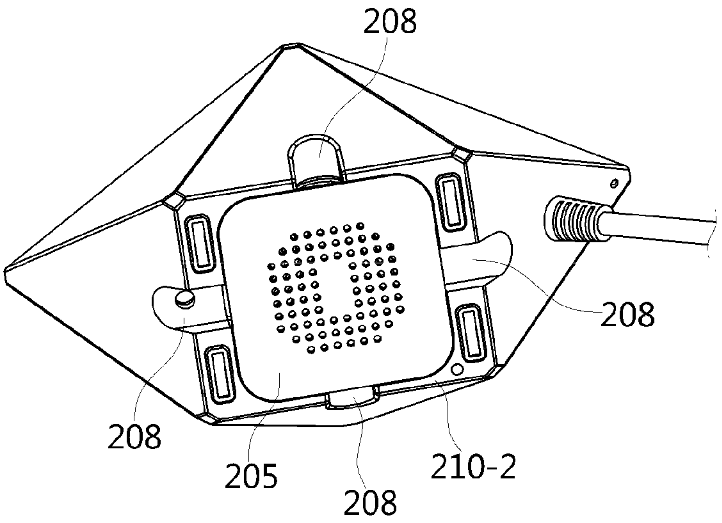

【Figure 26】
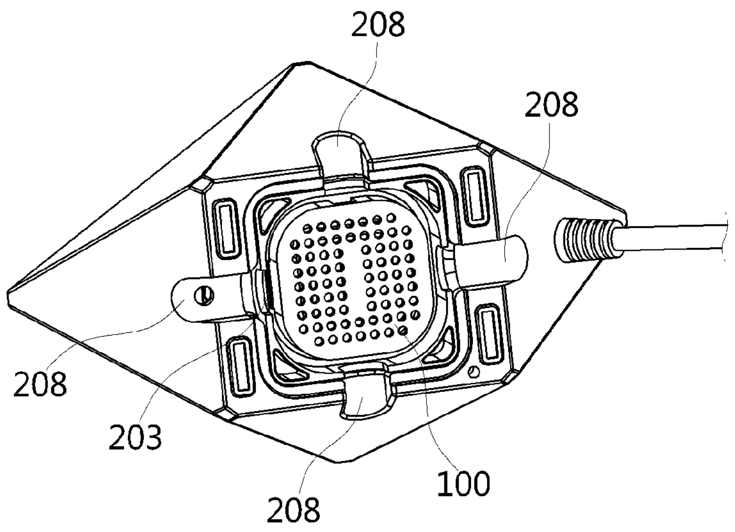
【Figure 27】
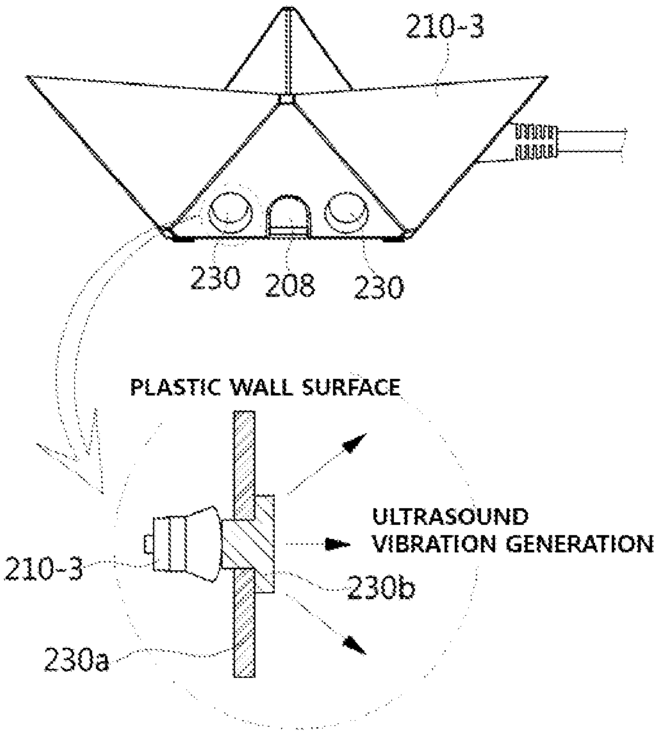

【Figure 28】
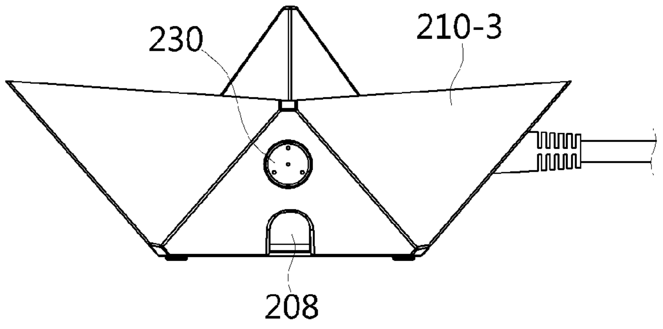

ELECTRODE HEATING UNIT AND DEVICE, AND CONTROL METHOD FOR PROTECTING ELECTRICAL SHORT THEREFOR

TECHNICAL FIELD

The present invention relates to an electrode heating unit, and more particularly to an electrode heating unit enhancing a heating function through multiple structures of a conductor and an electrode heating device including the same, and a control method for protecting an electrical short therefor.

BACKGROUND ART

In general, as electric boilers that heat water, an electrode type, a resistor type, and a heating wire type are widely used.

As the electrode type, a scheme of heating the water by generating Joule heat through current between electrodes by using the water itself as an electric resistor is used, and as the resistor type or the heating wire type, a scheme of directly or indirectly putting a metal resistor line in the water and using generated heat is used.

However, the conventional electrode type heating unit used for the electric boiler which is just a one-layer structure having a positive pole (+) and a negative pole (−) cannot efficiently heat the water. Therefore, an electrode type heating structure capable of more efficiently heating the water is required.

DETAILED DESCRIPTION OF INVENTION

Technical Problem

The present invention is directed to providing an electrode heating unit enhancing a heating function through multiple structures of a conductor and an electrode heating device including the same, and a control method for protecting an electrical short therefor.

Technical Solution

According to an aspect of the present invention, provided is an electrode heating device including: a device housing; an electrode heating unit including a central conductor, an internal conductor disposed to form a gap inside the central conductor, and an external conductor disposed to form the gap outside the central conductor, and received and installed in the device housing; and a control board received and installed inside the device housing, and applying power to an electrode of the electrode heating unit, and controlling a heat generation operation of the electrode heating unit.

In the embodiment of the present invention, the central conductor of the electrode heating unit may include a plate type first body portion, and a first power applied portion formed to protrude at one side of the first body portion and applied with any one power of positive (+) power and negative (−) power, the internal conductor of the electrode heating unit may be formed at the center of the surface of the external conductor in the bar shape integrally or separately, and applied with the other one power of the positive (+) power and the negative (−) power, and the external conductor of the electrode heating unit may include a second body portion having multiple inflow holes through which water flows around a portion where the internal conductor is formed on the surface of the external conductor, and receiving the first body portion, and disposed to form the gap on an exterior of the first body portion; and a second power applied portion which is formed to protrude at one side of the second body portion, and is applied with the other one power of the positive (+) power and the negative (−) power.

In the embodiment of the present invention, the control board may include an electrode heating unit circuit unit for applying power to the electrode of the electrode heating unit; a leakage current detector detecting leakage current of the electrode heating unit circuit unit; and an AC phase controller operating an inverse phase relay and removing the leakage current according to the detection of the leakage current.

In the embodiment of the present invention, the device housing may include a receiving space for receiving the electrode heating unit inside the center of a housing bottom surface; a cover plate installed to cover the receiving space of the housing bottom surface and having multiple water inflow holes on a plate surface, and a plurality of communication paths provided in a valley form around the cover plate on the bottom surface of the housing, and communicating with the receiving space.

In the embodiment of the present invention, the electrode heating device may further include one or multiple convection means installed on a side wall or the bottom surface of the device housing, and promoting the heat generated by the electrode heating unit to be propagated to the outside.

In this case, the control board may include a driving circuit for controlling the operation of the convection means. Further, the convection means may include at least one of an ultrasound generator, a high-frequency generator, an air bubble generator, an air pump, a water pump, and a propeller.

In the embodiment of the present invention, an overall shape of the device housing may have a ship shape appearance, and the device housing may be manufactured to have a specific gravity and a volume with which an upper portion of the housing may float on the water, and a visual indicator capable of checking an operation state of the electrode heating unit may be installed in the device housing according to an operation control of the control board.

Effects of Invention

The electrode heating unit according to the embodiment of the present invention can minimize the thickness of the electrode heating unit by using a plate type conductor to minimize the electrode heating unit, and can efficiently heat water through a structure of covering a positive (+) conductor with a negative (−) conductor. Further, while the conventional electrode heating unit is just the one-layer structure having the positive pole (+) and the negative pole (−), the electrode heating unit according to an embodiment of the present invention is capable of more efficiently heating the water through a structure of covering a central conductor which is a positive (+) electrode body with an internal conductor and an external conductor which are negative (−) electrode bodies, and a multi-layer structure of an upper cap and a lower cap.

Further, the electrode heating unit according to the embodiment of the present invention facilitates inflow of water through inflow holes of both the upper cap and the lower cap, and maximizes a contact area between the water and the electrode through a sandwich structure constituted by the upper cap and the lower cap separately or integrally to more efficiently heat the water.

Further, the electrode heating unit according to the embodiment of the present invention forms coating for protecting an internal electrode while allowing electricity to flow on each surface, such as diamond like carbon (DLC) to prevent generation of a floating matter.

Further, the electrode heating unit according to the embodiment of the present invention may provide a sterilization action by using oxygen (O2) generated by vibration and ionization of water molecules between the positive pole (+) and the negative pole (−), and softening of the water by H (hydrogen) and a growth promotion of plants.

Further, according to the control method of preventing the electrical shock applied to the electrode heating unit according to the embodiment of the present invention, there is an effect that when the leakage current is sensed and an electric leakage current is generated in the water according to a reverse phase, the phase of the alternating current (AC) is reversely changed to be changed to a normal state, thereby offsetting the electric leakage.

Further, according to the electrode heating device including the electrode heating unit according to the embodiment of the present invention, there is an effect that a convection means which assists convection and circulation of the water is included to heat the water quickly, thereby increasing total energy efficiency.

BRIEF DESCRIPTION OF THE DRAWINGS

FIG. 1 is a perspective view of an electrode heating unit according to an embodiment of the present invention.

FIG. 2 is an exploded perspective view of the electrode heating unit according to an embodiment of the present invention.

FIG. 3 is a diagram for describing the electrode heating unit according to an embodiment of the present invention.

FIG. 4 is an exterior diagram of the electrode heating unit according to an embodiment of the present invention.

FIG. 5 is a perspective view of an electrode heating unit according to another embodiment of the present invention.

FIG. 6 is an exploded perspective view of the electrode heating unit according to another embodiment of the present invention.

FIG. 7 is a perspective view of an electrode heating unit according to another embodiment of the present invention.

FIG. 8 is an exploded perspective view of the electrode heating unit according to another embodiment of the present invention.

FIG. 9 is a diagram for describing the electrode heating unit according to another embodiment of the present invention.

FIGS. 10 and 11 are exterior diagrams of the electrode heating unit according to another embodiment of the present invention.

FIG. 12 is a top view of the electrode heating unit according to another embodiment of the present invention.

FIG. 13 is a cross-sectional view of the electrode heating unit according to another embodiment of the present invention.

FIG. 14 is a diagram for describing the electrode heating unit according to another embodiment of the present invention.

FIGS. 15 and 16 are diagrams for describing the electrode heating unit according to another embodiment of the present invention.

FIGS. 17 and 18 are diagrams for describing the electrode heating unit according to yet another embodiment of the present invention.

FIGS. 19 and 20 are diagrams illustrating an electrical leakage phase controller in relation to current control of the electrode heating unit according to the present invention.

FIGS. 21 and 22 are diagrams for describing an operation principle of an AC phase controller in related to the current control of the electrode heating unit according to the present invention.

FIGS. 23 to 28 are diagrams for describing an electrode heating device according to an embodiment of the present invention.

BEST MODE

The present invention may apply various modifications and have various embodiments and specific embodiments will be illustrated in the drawings and described in detail in the detailed description. However, this is not intended to limit the present invention within specific embodiments, and it should be understood that the invention covers all the present modifications, equivalents and replacements within the idea and technical scope of the present invention.

In describing the present invention, a detailed description of related known technologies will be omitted if it is determined that they unnecessarily make the gist of the present invention unclear. In addition, numeral figures (for example, first, second, and the like) used during describing the specification are just identification symbols for distinguishing one element from another element.

Further, throughout the specification, if one component is referred to as “connected” or “accesses” with another component, it should be understood that the one component may be directly connected to or may directly access the other component, but unless explicitly described to the contrary, another component may be “connected” or “accessed” between the components. In addition, throughout the specification, when a part “comprises” a certain component, it means that other components may be further included, rather than excluding other components, unless otherwise described.

Hereinafter, an embodiment of the present invention will be described in detail with reference to the accompanying drawings.

FIG. 1 is a perspective view of an electrode heating unit according to an embodiment of the present invention, FIG. 2 is an exploded perspective view of the electrode heating unit according to an embodiment of the present invention, FIG. 3 is a diagram for describing the electrode heating unit according to an embodiment of the present invention, and FIG. 4 is an exterior diagram of the electrode heating unit according to an embodiment of the present invention.

Referring to FIGS. 1 to 3, an electrode heating unit 100 according to an embodiment of the present invention may be configured to include a central conductor 110, an internal conductor 120, an external conductor 130, an upper cap 140, and a lower cap 150.

The electrode heating unit 100 according to an embodiment of the present invention may quickly heat water by a positive (+) conductor and a negative (−) conductor.

The electrode heating unit 100 according to an embodiment of the present invention may be constituted by the central conductor 110, the internal conductor 120, the external conductor 130, the upper cap 130, and the lower cap 150, and more specifically may be made of a conductive material such as stainless, aluminum, copper, cast iron, brass, bronze, carbon, etc.

According to an embodiment of the present invention, the central conductor 110 may be constituted by a positive (+) conductor to which positive (+) power is applied, negative (−) power may be applied to the internal conductor 120 inside the central conductor 110, and the negative (−) power may also be similarly applied to the external conductor 130 of the central conductor 120 and may be constituted by the negative (−) conductor.

In this case, the internal conductor 120 is disposed to form a gap inside the central conductor 110 and the external conductor 130 is disposed to form the gap outside the central conductor 110, so that the central conductor 110 which is the positive (+) electrode, and the internal conductor 120 and the external conductor 130, which are the negative (−) electrodes, are insulated from each other.

Further, the central conductor 110 may be configured to include a first body portion 111 having a plate type ring shape and a first power applied portion 112 having a plate type bar shape, which extends from the first body portion 111 and is applied with the positive (+) power, and the external conductor 130 may be configured to include a second body part 131 disposed to form the gap outside the first body portion 110, and a second power applied portion 132 which extends from the second body portion 131 and is applied with the negative (−) power.

Further, the internal conductor 120 may be configured integrally with or separately from the surface of the upper cap 140, and may be configured to be formed in the bar shape or in the plate type ring shape having a predetermined gap inward the first body portion 111 to be applied with the negative (−) power.

Moreover, the electrode heating unit 100 according to an embodiment of the present invention is configured to further include the upper cap 140 and the lower cap 150.

Multiple inflow holes 141 through which the water flows may be formed on the surface of the upper cap 140 and may be coupled to one surface of the external conductor 130, and multiple inflow holes 151 may also be formed on the surface of the lower cap 150 so as for the water to easily flow and may be coupled to the other surface of the external conductor 130.

As a result, the upper cap 140 and the lower cap 150 are coupled to each other to receive the central conductor 110, the internal conductor 120, and the external conductor 130.

As such, the electrode heating unit 100 according to an embodiment of the present invention may provide more effective heating through a structure of covering the central conductor 110 which is the positive (+) electrode body with the internal conductor 120 and the external conductor 130, which are the negative (−) electrode bodies.

Further, while the conventional electrode heating unit is just the one-layer structure having the positive pole (+) and the negative pole (−), the electrode heating unit 100 according to an embodiment of the present invention is capable of more efficiently heating the water through the multi-layer structure of the upper cap 140 and the lower cap 150.

Further, the electrode heating unit 100 according to an embodiment of the present invention facilitates inflow of water through inflow holes 141 and 151 formed in both the upper cap 140 and the lower cap 150, and maximizes a contact area between the water and the electrode through a sandwich h structure constituted by the upper cap 140 and the lower cap 150 separately or integrally to more efficiently heat the water.

As such, in the electrode heating unit 100 according to the embodiment of the present invention, the central conductor 110, the internal conductor 120, the external conductor 130, the upper conductor 140, and the lower cap 150 are configured in a plate shape having a predetermined thickness and it is possible to minimize the thickness of the electrode heating unit 110 and efficiently heat the water through a structure of covering the central conductor 110 which is the positive (+) electrode body with the internal conductor 120, the external conductor 130, the upper cap 140, and the lower cap 150 which are the negative (−) electrode bodies.

Meanwhile, the electrode heating unit 100 according to the embodiment of the present invention forms coating for protecting an internal electrode while allowing electricity to flow on each surface, such as diamond like carbon (DLC) to prevent generation of a floating matter.

Further, referring to FIG. 4, the electrode heating unit 100 according to the embodiment of the present invention may be configured to be applied with the power from a power supply unit (not illustrated) through a power connector 101 receiving the first power applied portion 112 and the second power applied portion 132.

FIG. 5 is a perspective view of an electrode heating unit according to another embodiment of the present invention and FIG. 6 is an exploded perspective view of the electrode heating unit according to another embodiment of the present invention.

Hereinafter, a configuration of the electrode heating unit according to another embodiment of the present invention will be described with reference to FIGS. 5 and 6.

The electrode heating unit 100 according to the embodiment of FIGS. 5 and 6 may be configured to include the central conductor 110, the internal conductor 120, and the external conductor 130.

In this case, the electrode heating unit 100 may be constituted by the central conductor 110, the internal conductor 120, and the external conductor 130, and more specifically may be made of a conductive material such as stainless, aluminum, copper, cast iron, brass, bronze, carbon, etc.

The central conductor 110 may be applied with the positive (+) power, the internal conductor 120 and the external conductor 130 may be applied with the negative (−) power, and the central conductor 110 is configured to be insulated from the internal conductor 120 and the external conductor 130.

Further, multiple inflow holes through which the water flows may be formed on the surface of the external conductor 130 and the internal conductor 120 may be configured integrally with or separately from the surface of the external conductor.

FIG. 7 is a perspective view of an electrode heating unit according to another embodiment of the present invention, FIG. 8 is an exploded perspective view of the electrode heating unit according to another embodiment of the present invention, FIG. 9 is a diagram for describing the electrode heating unit according to another embodiment of the present invention, and FIGS. 10 and 11 are exterior diagrams of the electrode heating unit according to another embodiment of the present invention.

Referring to FIGS. 7 to 9, an electrode heating unit 100 according to another embodiment of the present invention may be configured to include the central conductor 110, the internal conductor 120, the external conductor 130, the upper cap 130, and the lower cap 150.

The electrode heating unit 100 according to another embodiment of the present invention may be constituted by the central conductor 110, the internal conductor 120, the external conductor 130, the upper cap 130, and the lower cap 150, and more specifically may be made of a conductive material such as stainless, aluminum, copper, cast iron, brass, bronze, carbon, etc.

According to another embodiment of the present invention, the central conductor 110 may be constituted by a positive (+) conductor to which positive (+) power is applied, negative (−) power may be applied to the internal conductor 120 inside the central conductor 110, and the negative (−) power may also be similarly applied to the external conductor 130 of the central conductor 120 and may be constituted by the negative (−) conductor.

In this case, the internal conductor 120 is disposed to form a gap inside the central conductor 110 and the external conductor 130 is disposed to form the gap outside the central conductor 110, and the central conductor 110 which is the positive (+) electrode, and the internal conductor 120 and the external conductor 130, which are the negative (−) electrodes, are insulated from each other.

In this case, the electrode heating unit 100 according to the embodiment of FIGS. 7 to 11 may be configured to have a rectangular appearance.

That is, the central conductor 110 may be configured to include a first body portion 111 having a plate type rectangular ring shape and a first power supply unit 112 having a plate type bar shape, which extends from the first body part 111 and is applied with the positive (+) power, and the external conductor 130 may be configured to include a second body part disposed to form the gap outside the first body portion 110, and a second power applied portion 132 which extends from the second body portion 131 and is applied with the negative (−) power.

Further, the internal conductor 120 may be configured to be formed in the bar shape integrally with or separately from the surface of the upper cap to be applied with the negative (−) power.

Moreover, the electrode heating unit 100 according to an embodiment of the present invention is configured to further include the upper cap 140 and the lower cap 150.

Multiple inflow holes 141 through which the water flows may be formed on the surface of the upper cap 140 and may be coupled to one surface of the external conductor 130, and multiple inflow holes 151 may also be formed on the surface of the lower cap 150 so as for the water to easily flow and may be coupled to the other surface of the external conductor 130.

As a result, the upper cap 140 and the lower cap 150 are coupled to each other to receive the central conductor 110, the internal conductor 120, and the external conductor 130.

As such, in the electrode heating unit 100 according to another embodiment of the present invention, the central conductor r 110, the internal conductor 120, the external conductor 130, the upper conductor 140, and the lower cap 150 are configured in a plate shape having a predetermined thickness and it is possible to minimize the thickness of the electrode heating unit 110 and efficiently heat the water through a structure of covering the central conductor 110 which is the positive (+) electrode body with the internal conductor 120, the external conductor 130, the upper cap 140, and the lower cap 150 which are the negative (−) electrode bodies.

Meanwhile, the electrode heating unit 100 according to an embodiment of the present invention forms coating for protecting an internal electrode while allowing electricity to flow on each surface, such as diamond like carbon (DLC) to prevent generation of a floating matter.

Further, referring to FIGS. 10 and 11, the electrode heating unit 100 according to another embodiment of the present invention may be configured to be applied with the power from a power supply unit (not illustrated) through a power connector 101 receiving the first power applied portion 112 and the second power applied portion 132.

FIG. 12 is a top view of the electrode heating unit according to another embodiment of the present invention and FIG. 13 is a cross-sectional view of the electrode heating unit according to another embodiment of the present invention.

The electrode heating unit 100 according to the embodiment of FIGS. 12 and 13 may be configured to include the central conductor 110, the internal conductor 120, and the external conductor 130.

The central conductor 110 may be applied with the positive (+) power, the internal conductor 120 and the external conductor 130 may be applied with the negative (−) power, and the central conductor 110 is configured to be insulated from the internal conductor 120 and the external conductor 130.

In this case, the central conductor 110 may be configured in a cylindrical structure in which multiple inflow holes through which the water flows are formed on the surface, the internal conductor 120 may be configured in the bar or cylindrical shape inserted into the central conductor 110, and the external conductor 130 may be configured in a cylindrical structure in which multiple inflow holes through which the water flows are formed on the surface and receive the central structure 110.

Further, the upper cap 140 having multiple inflow holes through which the water flows may be coupled to an upper portion, and in this case, the internal conductor 120 may be configured in a structure in which the internal conductor 120 is configured integrally with or coupled separately from the surface of the upper cap 140.

FIG. 14 is a diagram for describing the electrode heating unit according to another embodiment of the present invention.

The electrode heating unit 100 according to the embodiment of FIG. 14 may be configured to include the central conductor 110, the internal conductor 120.

In this case, the central conductor 110 may be formed in a ring shape or a plate type ring shape, and the internal conductor 120 may be configured in the bar or cylindrical shape inserted into the central conductor 110.

Further, the upper cap 140 having multiple inflow holes through which the water flows may be coupled to an upper portion, and in this case, the internal conductor 120 may be configured in a structure in which the internal conductor 120 is configured integrally with or coupled separately from the surface of the upper cap 140.

FIGS. 15 and 16 are diagrams for describing the electrode heating unit according to another embodiment of the present invention.

The electrode heating unit 100 according to the embodiment of FIGS. 15 and 16 may be configured to include the central conductor 110, the internal conductor 120, and the external conductor 130.

The central conductor 110 may be applied with the positive (+) power, the internal conductor 120 and the external conductor 130 may be applied with the negative (−) power, and the central conductor 110 is configured to be insulated from the internal conductor 120 and the external conductor 130.

In this case, the central conductor 110 may be configured in a cylindrical structure in which multiple inflow holes through which the water flows are formed on the surface, the internal conductor 120 may be configured in the bar or cylindrical shape inserted into the central conductor 110, and the external conductor 130 may be configured in a cylindrical structure in which multiple inflow holes through which the water flows are formed on the surface and receive the central structure 110.

As a result, in each of the electrode heating units 100 according to the embodiment of FIGS. 15 and 16, the central conductor 110 and the internal conductor 120 constitute multiple heating structures A to more efficiently heat the water.

Further, as illustrated in FIG. 16, an auxiliary conductor 160 is disposed in a space between multiple heating structures A to enable more efficient heating of the water.

Further, the upper cap having multiple inflow holes through which the water flows may be additionally coupled to an upper portion, and in this case, the internal conductor 120 may be configured in a structure in which the internal conductor 120 is configured integrally with or coupled separately from the surface of the upper cap. Similarly, a lower cap having multiple inflow holes may be additionally coupled to a lower portion of the external conductor 130.

In association with the structure, as another structure, the structure of the electrode heating unit according to yet another embodiment of the present invention illustrated in FIGS. 17 and 18 may also be adopted. According to the structures of FIGS. 17 and 18, electrodes outside the negative (−) pole includes two holes at both sides in addition to a bottom hole (in this case, the number of side holes may also be one or three or more), and this becomes a structure for further facilitating the flow of the water.

That is, referring to FIGS. 17 and 18, in the electrode heating unit 100 according to the embodiment of the present invention, the central conductor 110 includes a first body portion 111 having a plate type rectangular ring shape; and a first power applied portion 112 which is formed to protrude at one side of the first body portion 111 and is applied with any one power of the positive (+) power and the negative (−) power.

Further, the internal conductor 120 may be formed at the center of the surface of the external conductor 130 in the bar shape integrally or separately, and may be applied with the other one power of the positive (+) power and the negative (−) power.

Further, multiple inflow holes through which the water flows is formed around a portion where the internal conductor 120 is formed in the surface of the external conductor 130, and the external conductor 130 receives the first body portion 111, and may include a second body portion 131 disposed to form the gap on an exterior of the first body portion 111; and a second power applied portion 132 which is formed to protrude at one side of the second body portion 131, and is applied with the other one power of the positive (+) power and the negative (−) power.

As described above, the electrode heating unit according to the embodiment of the present invention can minimize the thickness of the electrode heating unit by using a plate type conductor to minimize the electrode heating unit, and efficiently heat water through a structure of covering a positive (+) conductor with a negative (−) conductor, and while the conventional electrode heating unit is just the one-layer structure having the positive pole (+) and the negative pole (−), the electrode heating unit according to an embodiment of the present invention is capable of more efficiently heating the water through a structure of covering a central conductor which is a positive (+) electrode body with an internal conductor and an external conductor, which are negative (−) electrode bodies, and a multi-layer structure of an upper cap and a lower cap.

Further, the electrode heating unit according to the embodiment of the present invention facilitates inflow of water through inflow holes of both the upper cap and the lower cap, and maximizes a contact area between the water and the electrode through a sandwich structure constituted by the upper cap and the lower cap separately or integrally to more efficiently heat the water.

FIGS. 19 and 20 are diagrams illustrating an electrical leakage phase controller in relation to current control of the electrode heating unit according to the present invention and FIGS. 21 and 22 are diagrams for describing an operation principle of an AC phase controller in related to the current control of the electrode heating unit according to the present invention.

In general, for AC current, a graph of a wave parabola in which positive and negative phases are continuously changed up and down is drawn, and when the ground is not well made, a problem of an electrical shock may also occur.

However, three phases are used or a neutral is included to solve the problem in that the phases are changed, but even in such a case, if + and − at a product side and + and − at an electricity side meet differently, the leakage may occur and an electrical shock risk due to the electric leakage may be present even in this case.

In particular, the electrode body enters the water to electrolyze the water, and as a result, a molecular structure in the water is transformed or in the case of an electrode heating unit product generating heat by vibration and collision, the problem due the leakage current may be more active.

Therefore, in order to solve the problem due to the leakage current in the electrode heating unit product, in the present invention, the leakage current is removed by a circuit system which automatically detects a situation in which the leakage current is generated and changes the leakage current to an inverse phase, and if the problem of the electrical shock continuously occurs, the system is automatically turned off to secure safety.

In an electric leakage phase controller of FIG. 19, in a normal state, when terminals L and N are normally connected to a heater, the leakage current does not flow. On the contrary, in the case of the inverse phase as in FIG. 20, when the terminals L and N are abnormally connected (inverse phase), the leakage current is generated and whether the current leaks is detected in a zero current transformer (ZCT).

Referring to FIGS. 21 and 22, the AC phase controller according to the present invention operates by 1) detection of the leakage current with the ZCT, 2) when the leakage is 1 MA or more, as an inverse phase relay operates and a current state is changed to the normal state, removal of the leakage current, and 3) a total power shut-down process when the normal state is not achieved through a continuous attempt.

FIGS. 23 to 28 are diagrams for describing an electrode heating device according to an embodiment of the present invention.

Referring to FIGS. 23 to 28, an electrode heating device 200 includes a device housing 210; an electrode heating unit 100 received and installed in the device housing; and a control board 220 applying power to an electrode of the electrode heating unit and controlling a heat generation operation of the electrode heating unit.

Here, as the electrode heating unit 100, the electrode heating unit according to the embodiment of each of FIGS.

1 to 18 described above may be used. However, in this example, a case where the electrode heating units according to the forms of FIGS. 17 and 18 are installed is exemplified.

Further, the electrode heating device 200 according to the embodiment of the present invention may include a circuit configuration for preventing the leakage current according to FIGS. 19 to 22 described above. To this end, the control board 220 may include an electrode heating unit circuit unit for applying the power to the electrode of the electrode heating unit; a leakage current detector (e.g., the ZCT, etc.) detecting the leakage current of the electrode heating unit; and an AC phase controller operating the inverse phase relay and removing the leakage current according to detection of the leakage current. In this case, the power may be supplied by an autonomous power supply and supplied from an external power supply through a cable (see Cable of FIG. 23).

In the embodiment of the present invention, the device housing 210 may include a receiving space 203 for receiving the electrode heating unit 100 inside the center of a housing bottom surface 210-2; a cover plate 205 installed to cover the receiving space 203 of the housing bottom surface 210-2 and having multiple inflow holes on a plate surface; and a plurality of communication paths 208 provided in a valley form around the cover plate (in this example, positioned at all locations around the cover plate), and communicating with the receiving space.

In such a case, the valley is applied to a portion where the water become hot by the electrode heating unit to more well diffuse the water, and the pressure is generated while the hot water is collected, and water bubbles are generated by the valley (an arch type valley in the drawing) to assist the circulation of the water.

Further, in the embodiment of the present invention, the device housing 210 may further include multiple convection means 230 installed on a side wall 210-3 or the bottom surface 210-2 of the device housing 210, and promoting the heat generated by the electrode heating unit 100 to be propagated to the outside.

In this case, the control board 220 may include a driving circuit for controlling the operation of the convection means 230. Further, the convection means 230 may include at least one of an ultrasound generator (see FIG. 27), a high-frequency generator, an air bubble generator (i.e., an aerator, see FIG. 28), an air pump, a water pump, and a propeller. Besides, various convection means which derives the convection of the fluid may be applied, of course. In the case of FIG. 27, a case where the ultrasound generator is adopted as the convection means, and in this case, the ultrasound generator may be constituted by an ultrasound vibrator 230*a* and a vibration plate 230*b*. Here, the vibration plate 230*b* serves to extend an ultrasound generated from the ultrasound vibrator 230 to the outside. Further, in the case of FIG. 28, a case where the air bubble generator is adopted, and in this case, the generated air bubbles may be discharged to the outside while preventing external water from flowing inside through a porous plate.

As described above, the convection means 230 is further provided and the water warmed through the electrode heating unit is convected or the water is circulated by generation of the air bubbles to warm the water more quickly. That is, in the present invention, the electrode heating unit activates and ionizes the water molecules to generate heat due to a collision between molecules, and as a result, heat having a highest temperature is made in the vicinity of an area contacting the water and gradually spreads, so only a very small portion becomes hot within a short time. Therefore, the convection means 230 is also installed to mix even the hot water.

Further, in the embodiment of the present invention, an overall shape of the device housing 210 has a ship shape appearance, and the device housing 210 may be manufactured to have a specific gravity and a volume with which an upper portion of the housing may float on the water. However, in the present invention, the shape of the device housing is not particularly limited.

Further, in the embodiment of the present invention, a visual indicator (see Indicator of FIG. 23, e.g., an LED, etc.) capable of checking an operation state of the electrode heating unit may be installed on the top surface 210-1 of the housing 210 according to an operation control of the control board. However, an installation location of the visual indicator is not limited thereto, and may be various locations such as the housing side wall, the housing bottom surface, etc., of course.

The present invention has been described with reference to the embodiments. However, it will be able to be easily appreciated by those skilled in the art that various modifications and changes of the present invention can be made without departing from the spirit and the scope of the present invention which are defined in the appended claims and their equivalents.

The invention claimed is:

1. An electrode heating device comprising:
- a device housing;
- an electrode heating unit including a central conductor, an internal conductor disposed to form a gap inside the central conductor, and an external conductor disposed to form the gap outside the central conductor, and received and installed in the device housing; and
- a control board received and installed inside the device housing, and applying power to an electrode of the electrode heating unit, and controlling a heat generation operation of the electrode heating unit,
- wherein the device housing includes
- a receiving space for receiving the electrode heating unit inside the center of a housing bottom surface,
- a cover plate installed to cover the receiving space of the housing bottom surface and having multiple water inflow holes on a plate surface, and
- a plurality of communication paths provided in a valley form around the cover plate, and communicating with the receiving space.

2. The electrode heating device of claim 1, wherein the central conductor of the electrode heating unit includes a plate type first body portion, and a first power applied portion formed to protrude at one side of the first body portion and applied with any one power of positive (+) power and negative (−) power,
- the internal conductor of the electrode heating unit is formed at the center of the surface of the external conductor in the bar shape integrally or separately, and applied with the other one power of the positive (+) power and the negative (−) power, and
- the external conductor of the electrode heating unit includes a second body portion disposed to form the gap on an exterior of the first body portion; and a second power applied portion which is formed to protrude at one side of the second body portion, and is applied with the other one power of the positive (+) power and the negative (−) power.

3. The electrode heating device of claim 1, wherein the control board includes an electrode heating unit circuit unit for applying power to the electrode of the electrode heating unit;

a leakage current detector detecting leakage current of the electrode heating unit circuit unit; and an AC phase controller operating an inverse phase relay and removing the leakage current according to the detection of the leakage current.

4. The electrode heating device of claim 1, further comprising:

one or multiple convection means installed on a side wall or the bottom surface of the device housing, and promoting the heat generated by the electrode heating unit to be propagated to the outside.

5. The electrode heating device of claim 4, wherein the control board includes a driving circuit for controlling the operation of the convection means, and the convection means includes at least one of an ultrasound generator, a high-frequency generator, an air bubble generator, an air pump, a water pump, and a propeller.

* * * * *